(12) United States Patent
Huang

(10) Patent No.: US 10,180,599 B2
(45) Date of Patent: Jan. 15, 2019

(54) DISPLAY PANEL AND DISPLAY DEVICE

(71) Applicant: SHENZHEN CHINA STAR OPTOELECTRONICS TECHNOLOGY CO., LTD., Guangdong (CN)

(72) Inventor: Shishuai Huang, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 426 days.

(21) Appl. No.: 14/417,780

(22) PCT Filed: Nov. 27, 2014

(86) PCT No.: PCT/CN2014/092334
§ 371 (c)(1),
(2) Date: Jan. 27, 2015

(87) PCT Pub. No.: WO2016/078110
PCT Pub. Date: May 26, 2016

(65) Prior Publication Data
US 2016/0147095 A1 May 26, 2016

(30) Foreign Application Priority Data
Nov. 20, 2014 (CN) .......................... 2014 1 0667636

(51) Int. Cl.
G02F 1/1339 (2006.01)
G02F 1/1341 (2006.01)
G02F 1/1335 (2006.01)

(52) U.S. Cl.
CPC ...... *G02F 1/1339* (2013.01); *G02F 1/133514* (2013.01); *G02F 1/1341* (2013.01)

(58) Field of Classification Search
CPC combination set(s) only.
See application file for complete search history.

(56) References Cited

U.S. PATENT DOCUMENTS

2007/0058125 A1 3/2007 Yoo et al.
2007/0291216 A1* 12/2007 Chan ..................... G02F 1/1339
349/153

(Continued)

FOREIGN PATENT DOCUMENTS

CN 1550827 A 12/2004
CN 101256317 A 9/2008

(Continued)

OTHER PUBLICATIONS

Yoon, KR 2004-0048172 English language machine translation.*

Primary Examiner — Jessica M Merlin
Assistant Examiner — Mark D Teets
(74) Attorney, Agent, or Firm — WPAT, PC

(57) ABSTRACT

A display panel and a display device are provided. The display panel has a color filter substrate, a thin film transistor array substrate, a liquid crystal layer, and a sealing element. The sealing element is disposed on a non-active area of a liquid crystal cell. The sealing element has at least four sealing sections having beginnings and ends connected to each other. The sealing sections have at least one sealant segment and at least one color resist segment. The at least one sealant segment and the at least one color resist segment are integrated with each other. A narrow frame of the display panel is achieved.

16 Claims, 10 Drawing Sheets

(56) References Cited

U.S. PATENT DOCUMENTS

| | | | |
|---|---|---|---|
| 2010/0007842 A1* | 1/2010 | Terao | G02F 1/1339 349/153 |
| 2011/0222013 A1* | 9/2011 | Kawanishi | G02F 1/1339 349/153 |
| 2013/0114012 A1 | 5/2013 | Liu | |
| 2013/0308079 A1 | 11/2013 | Chen | |
| 2013/0335686 A1 | 12/2013 | Chen | |
| 2015/0103298 A1* | 4/2015 | Lee | G02F 1/13378 349/123 |

FOREIGN PATENT DOCUMENTS

| | | |
|---|---|---|
| CN | 102122102 A | 7/2011 |
| CN | 102354064 A | 2/2012 |
| CN | 102681237 A | 9/2012 |
| CN | 102707509 A | 10/2012 |
| CN | 102830519 A | 12/2012 |
| CN | 103207480 A | 7/2013 |
| CN | 103676337 A | 3/2014 |
| JP | H11237621 A | 8/1999 |
| KR | 20040048172 A | 6/2004 |

\* cited by examiner

US 10,180,599 B2

DISPLAY PANEL AND DISPLAY DEVICE

CROSS REFERENCE TO RELATED APPLICATIONS

This application is a U.S. National Phase application submitted under 35 U.S.C. § 371 of Patent Cooperation Treaty Application serial No. PCT/CN2014/092334, filed on Nov. 27, 2014, which claims the priority of China Patent Application serial No. 201410667636.1, filed on Nov. 20, 2014, the disclosures of which are incorporated herein by reference.

FIELD OF THE INVENTION

The present invention relates to display technologies, and more particularly to a display panel and a display device.

BACKGROUND OF THE INVENTION

Traditional display panels generally have sealants disposed at the edges of the display panels. The sealant is used for sealing the display panel for preventing the liquid crystal molecules from leaking.

For the purpose of promoting display quality, the sealant is generally designed to be very narrow in the traditional technical solution in order to comply with the requirement of a narrower frame.

However, considering the sealing property of the display panel, the tendency to narrow down the sealant is limited because the display panel cannot be sealed effectively by the excessively narrow width of the sealant. Therefore, the width of the sealant cannot be further narrowed, and the display quality of the display panel cannot be further promoted.

Furthermore, the traditional sealant generally has spacers disposed therein. The spacers are formed by main materials, such as melamine resin and polystyrene resin, which have a compressive ratio higher than that of the photo spacers disposed within the active area. Therefore, compression is more serious within the regions of the sealant, which results in less cell gaps in the regions where the sealant is disposed than that in the active area, so that mura occurs in the regions where the sealant is disposed.

It is therefore necessary to provide a new technical solution to solve the problems existing in the conventional technology as described above.

SUMMARY OF THE INVENTION

An object of the present invention is to provide a display panel and a display device so as to achieve a narrow frame for the display panel.

To solve the above problem, the present invention provides a technical solution as follows:

A display panel, comprising a color filter substrate; a thin film transistor array substrate stacked on the color filter substrate to integrate therewith; a liquid crystal layer disposed between the thin film transistor array substrate and the color filter substrate; and a sealing element disposed between the thin film transistor array substrate and the color filter substrate; wherein the sealing element surrounds the liquid crystal layer, and is used for sealing a liquid crystal cell formed by the thin film transistor array substrate and the color filter substrate; the liquid crystal cell includes an active area and a non-active area, the non-active area disposed outside of the active area, the sealing element disposed on the non-active area; the sealing element includes at least four sealing sections having beginnings and ends connected to each other, so as to form a sealing frame; and the sealing sections comprise at least one sealant segment, and at least one color resist segment; wherein the at least one sealant segment and the at least one color resist segment are integrated with each other, the color resist segment further has a via hole passing through the color resist segment and a protective layer on the thin film transistor array substrate in a first direction, the first direction is perpendicular to the color filter substrate; the via hole has a conductive layer disposed on a side wall of the via hole, the conductive layer is connected to a common electrode on the color filter substrate and a common line on the thin film transistor array substrate; and the color resist segment comprises a first color resist material layer, and a second color resist material layer; wherein the first color resist material layer and the second color resist material layer are integrated by stacking each other in the first direction; and a second surface of the second color resist material layer is stacked on a first surface of the first color resist material layer.

In the abovementioned display panel, the sealant segment is a sealant strip; the color resist segment is a color resist strip; and the sealant strip and the color resist strip are disposed side by side.

A display panel, comprising a color filter substrate; a thin film transistor array substrate stacked on the color filter substrate to integrate therewith; a liquid crystal layer disposed between the thin film transistor array substrate and the color filter substrate; and a sealing element disposed between the thin film transistor array substrate and the color filter substrate, wherein the sealing element surrounds the liquid crystal layer, and is used for sealing a liquid crystal cell formed by the thin film transistor array substrate and the color filter substrate; wherein the liquid crystal cell includes an active area and a non-active area, the non-active area disposed outside of the active area, the sealing element disposed on the non-active area; the sealing element includes at least four sealing sections having beginnings and ends connected to each other so as to form a sealing frame; and the sealing sections comprise at least one sealant segment, and at least one color resist segment; wherein the at least one sealant segment and the at least one color resist segment are integrated with each other.

In the abovementioned display panel, the sealant segment is a sealant strip; the color resist segment is a color resist strip; the sealant strip and the color resist strip are disposed side by side; and the color resist strip and the sealant strip are used together for supporting the thin film transistor array substrate and the color filter substrate, and for sealing the liquid crystal cell.

In the abovementioned display panel, the sealant strip is disposed between two color resist strips.

In the abovementioned display panel, the sealant strip is disposed next to the color resist strip at a side near the liquid crystal layer.

In the abovementioned display panel, the sealant segment includes at least one mesh, and the color resist segment includes at least one color resist block, wherein the color resist block is filled in the mesh.

In the abovementioned display panel, the color resist segment further has a via hole passing through the color resist segment and a protective layer on the thin film transistor array substrate in a first direction, the first direction is perpendicular to the color filter substrate; and the via hole has a conductive layer disposed on a side wall of the via hole, the conductive layer is connected to a common electrode on the color filter substrate and a common line on the thin film transistor array substrate.

In the abovementioned display panel, the color resist segment comprises a first color resist material layer, and a second color resist material layer; the first color resist material layer and the second color resist material layer are integrated by stacking each other in the first direction; and a second surface of the second color resist material layer is stacked on a first surface of the first color resist material layer.

In the abovementioned display panel, the first surface of the first color resist material layer has a first recess, the second surface of the second color resist material layer has a first protrusion, and the first recess on the first surface is disposed at a position corresponding with where the first protrusion is disposed on the second surface.

In the abovementioned display panel, the first surface of the first color resist material layer has a second protrusion, the second surface of the second color resist material layer has a second recess, and the second protrusion on the first surface is disposed at a position corresponding with where the second recess is disposed on the second surface.

A display device, comprising a backlight module; and a display panel stacked on the backlight module to integrate therewith; wherein the display panel comprises a color filter substrate; a thin film transistor array substrate stacked on the color filter substrate to integrate therewith; a liquid crystal layer disposed between the thin film transistor array substrate and the color filter substrate; and a sealing element disposed between the thin film transistor array substrate and the color filter substrate, wherein the sealing element surrounds the liquid crystal layer, and is used for sealing a liquid crystal cell formed by the thin film transistor array substrate and the color filter substrate; wherein the liquid crystal cell includes an active area and a non-active area, the non-active area disposed outside of the active area, the sealing element disposed on the non-active area; the sealing element includes at least four sealing sections having beginnings and ends connected to each other so as to form a sealing frame; and the sealing sections comprise at least one sealant segment, and at least one color resist segment; wherein the at least one sealant segment and the at least one color resist segment are integrated with each other.

In the abovementioned display device, the sealant segment is a sealant strip; the color resist segment is a color resist strip; the sealant strip and the color resist strip are disposed side by side; and the color resist strip and the sealant strip are used together for supporting the thin film transistor array substrate and the color filter substrate, and for sealing the liquid crystal cell.

In the abovementioned display device, the sealant strip is disposed between two color resist strips.

In the abovementioned display device, the sealant strip is disposed next to the color resist strip at a side near the liquid crystal layer.

In the abovementioned display device, the sealant segment includes at least one mesh, and the color resist segment includes at least one color resist block, wherein the color resist block is filled in the mesh.

In the abovementioned display device, the color resist segment further has a via hole passing through the color resist segment and a protective layer on the thin film transistor array substrate in a first direction, the first direction is perpendicular to the color filter substrate; and the via hole has a conductive layer disposed on a side wall of the via hole, the conductive layer is connected to a common electrode on the color filter substrate and a common line on the thin film transistor array substrate.

In the abovementioned display device, the color resist segment comprises a first color resist material layer, and a second color resist material layer; the first color resist material layer and the second color resist material layer are integrated by stacking each other in the first direction; and a second surface of the second color resist material layer is stacked on a first surface of the first color resist material layer.

In the abovementioned display device, the first surface of the first color resist material layer has a first recess, the second surface of the second color resist material layer has a first protrusion, and the first recess on the first surface is disposed at a position corresponding with where the first protrusion is disposed on the second surface.

In the abovementioned display device, the first surface of the first color resist material layer has a second protrusion, the second surface of the second color resist material layer has a second recess, and the second protrusion on the first surface is disposed at a position corresponding with where the second recess is disposed on the second surface.

Compared with the prior art, a narrow frame of the display panel can be realized by present invention without losing structural strength and the sealing property of the sealing element.

The following embodiments are referring to the accompanying drawings for exemplifying specific implementable embodiments of the present invention, and for making the technical solution and the benefits of the present invention easily understood.

DETAILED DESCRIPTION OF THE PREFERRED EMBODIMENTS

The word "embodiment" means "example", "instance", or "illustration" in the specification. Furthermore, if there is no specific description in the invention, singular terms such as "a", "one", and "the" include the plural number.

Figure 1:
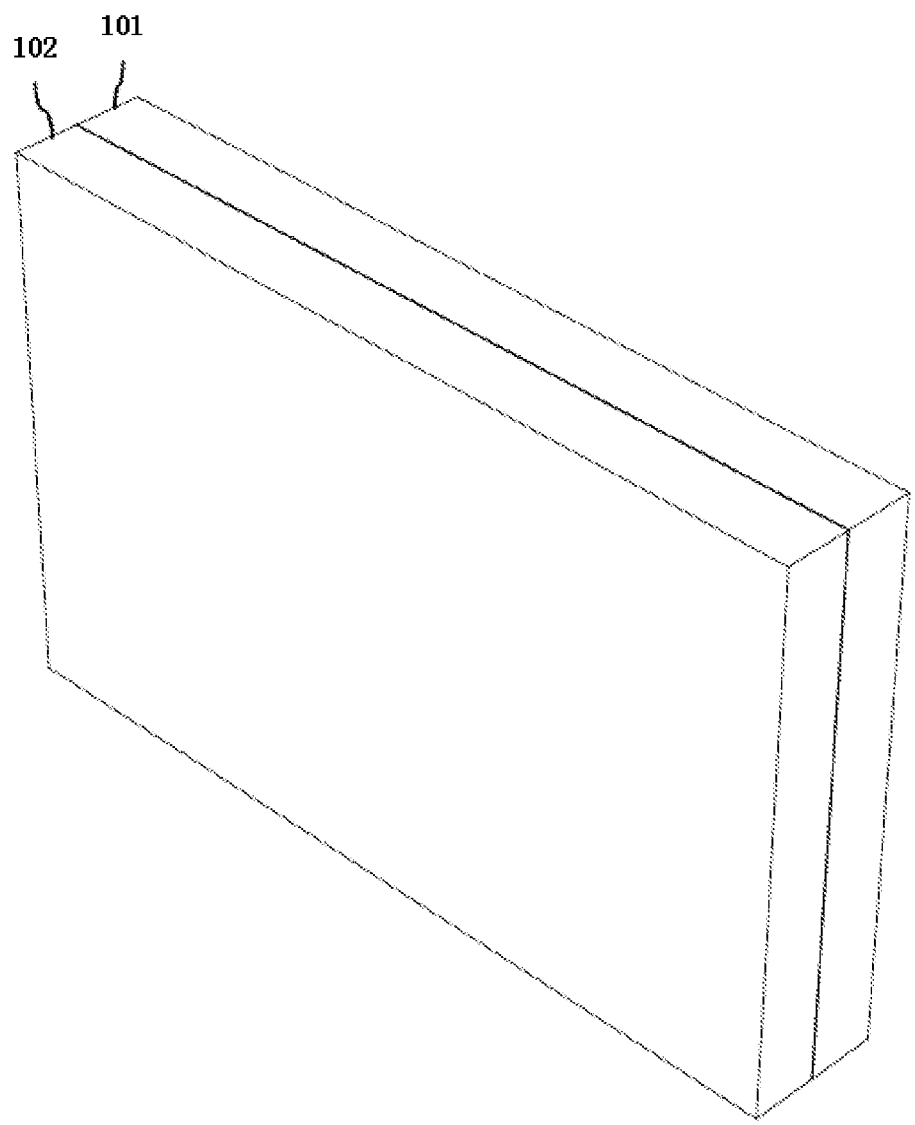
FIG. 1 is a schematic view of a display device according to the present invention.

Refer to FIG. 1, which is a schematic view of a display device of the present invention.

The display device of the present invention comprises a backlight module 101, and a display panel 102 stacked on the backlight module 101 which integrate with each other. The display panel 102 can be a TFT-LCD (Thin Film Transistor Liquid Crystal Display) display panel.

Figure 2:
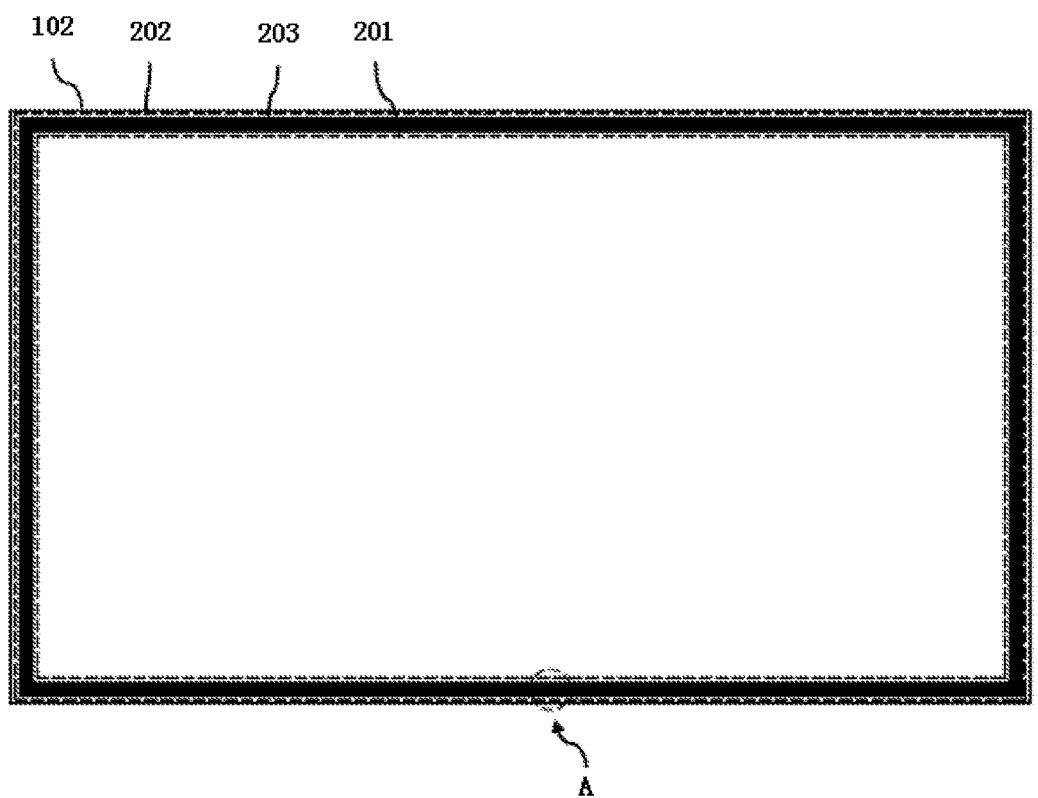
FIG. 2 is a schematic view of the display panel illustrated in FIG. 1.
Figure 3:
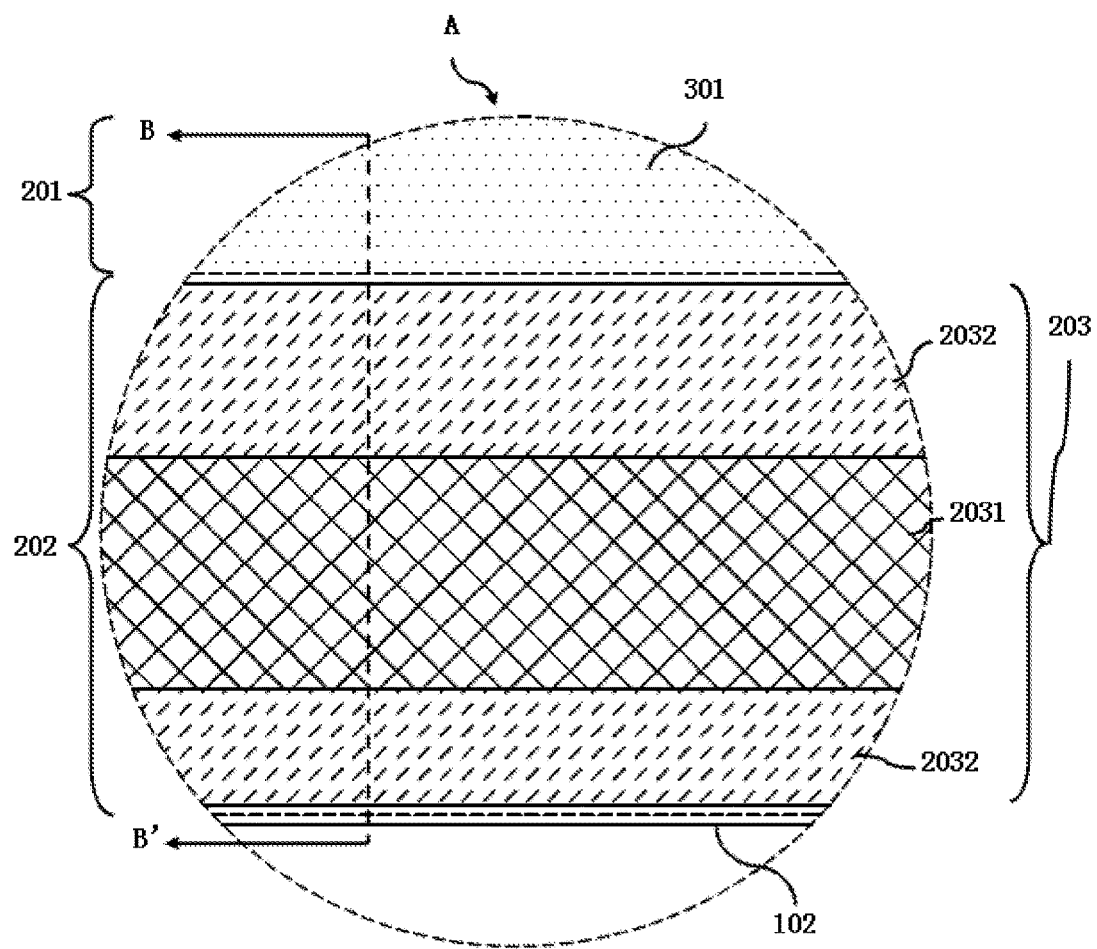
FIG. 3 is a partially enlarged top view of region A in FIG. 2 according to a first embodiment of the present invention.
Figure 4:
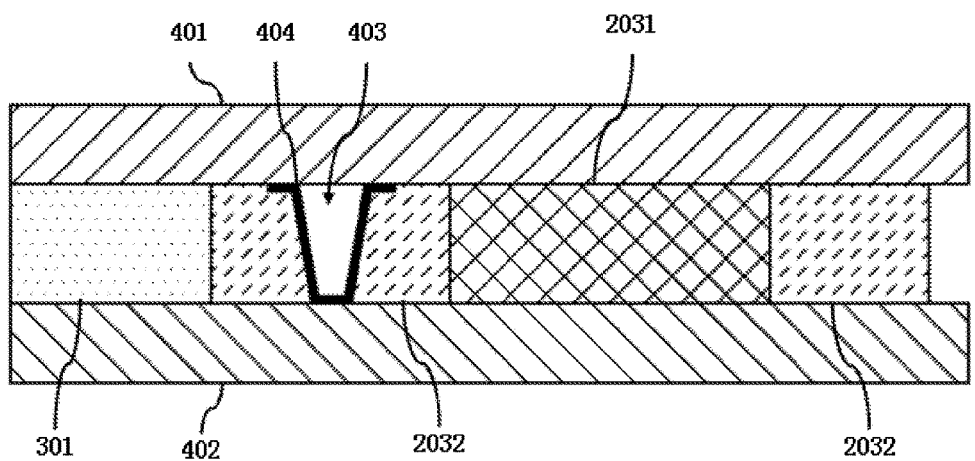
FIG. 4 is a cross-sectional view taken along a line B-B' in FIG. 3.

Refer to FIGS. 2~4. FIG. 2 is a schematic view of the display panel 102 illustrated in FIG. 1, FIG. 3 is a partially enlarged top view of region A in FIG. 2 according to a first embodiment of the present invention, and FIG. 4 is a cross-sectional view taken along a line B-B' in FIG. 3.

The display panel 102 in the present invention includes a color filter substrate 401, a thin film transistor array substrate 402, a liquid crystal layer 301, and a sealing element 203.

The thin film transistor array substrate 402 is stacked on the color filter substrate 401 so that they integrate with each other. The liquid crystal layer 301 is disposed between the thin film transistor array substrate 402 and the color filter substrate 401. The sealing element 203 is disposed between the thin film transistor array substrate 402 and the color filter substrate 401. The sealing element 203 is formed into a rectangle, and surrounds the liquid crystal layer 301. The sealing element 203 is used for sealing a liquid crystal cell formed by the thin film transistor array substrate 402 and the color filter substrate 401.

The liquid crystal cell includes an active area 201 and a non-active area 202. The non-active area 202 is disposed outside of the active area 201. The sealing element 203 is disposed on the non-active area 202. The non-active area 202 surrounds the active area 201.

The sealing element 203 includes at least four sealing sections having beginnings and ends connected to each other, so as to form a sealing frame. The sealing sections comprise at least one sealant segment, and at least one color resist segment. The at least one sealant segment and the at least one color resist segment are integrated with each other.

In this embodiment, the sealant segment is a sealant strip 2031; the color resist segment is a color resist strip 2032; and the sealant strip 2031 and the color resist strip 2032 are disposed side by side. The sealant strip 2031 is disposed between two of the color resist strips 2032. The color resist strip 2032 and the sealant strip 2031 are used together for supporting the thin film transistor array substrate 402 and the color filter substrate 401, and for sealing the liquid crystal cell In this embodiment, the sealing element 203 has a width (a total width of the color resist strip 2032 and the sealant strip 2031) ranged from 200 μm to 4000 μm.

In this embodiment, the color resist segment further has a via hole 403 passing through the color resist segment and a protective layer on the thin film transistor array substrate 402 in a first direction. The first direction is perpendicular to the color filter substrate. The via hole 403 has a conductive layer 404 disposed on a side wall thereof. The conductive layer 404 is connected to a common electrode on the color filter substrate 401 and a common line on the thin film transistor array substrate 402.

In the above technical solution, since the sealing sections have the color resist strip 2032 and the sealant strip 2031, the color resist strip 2032 can be used for supporting the thin film transistor array substrate 402 and the color filter substrate 401, so that the spacers in the sealant can be removed. Therefore, a narrow frame of the display panel 102 can be realized without losing structural strength and the sealing property of the sealing element 203. That is, the structural strength and the sealing property of the sealing element 203 can be kept when the sealing element 203 has a narrowed width.

Furthermore, since the sealing sections include the color resist strip 2032 having a compressive strength higher than that of the conventional spacers, so that it is beneficial for reducing the difference in the gap of the liquid crystal cell between the regions corresponding to the sealing sections (the nonactive area 202) and the active area 201, so that mura occurring in the surroundings of the sealing element 203 (the nonactive area 202) can be prevented.

Moreover, since the color resist strip 2032 includes the via hole 403 and the conductive layer 404, the gold balls (Au balls) can be removed from the sealant so that the costs can be saved.

Figure 5:
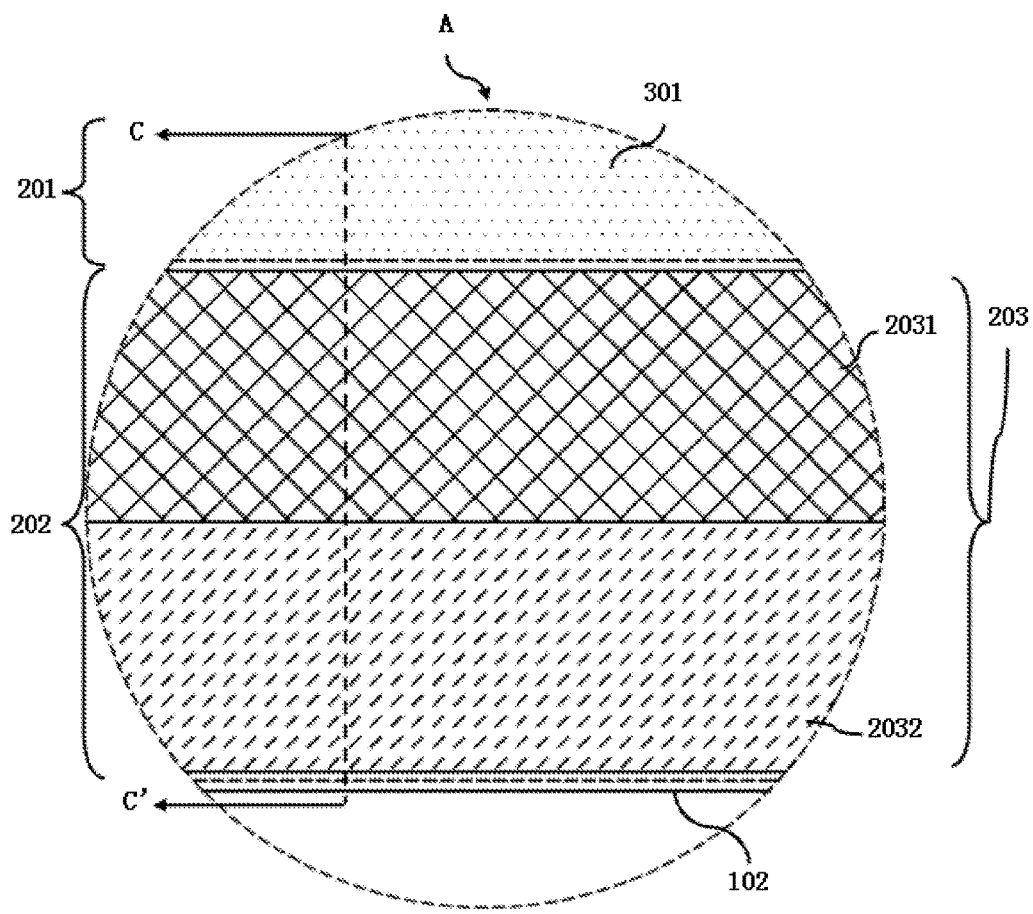
FIG. 5 is a partially enlarged top view of region A in FIG. 2 according to a second embodiment of the present invention.
Figure 6:
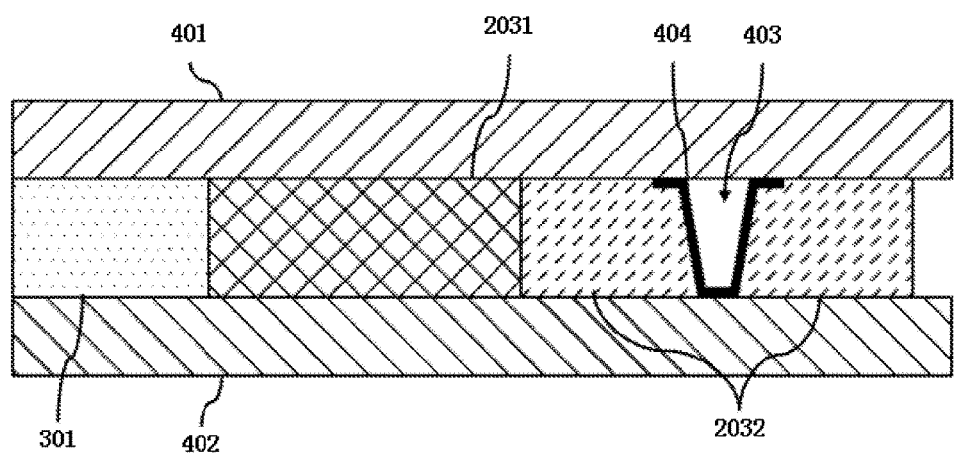
FIG. 6 is a cross-sectional view taken along a line C-C' in FIG. 5.

Refer to FIG. 5 and FIG. 6. FIG. 5 is a partially enlarged top view of region A in FIG. 2 according to a second embodiment of the present invention, and FIG. 6 is a cross-sectional view taken along a line C-C' in FIG. 5. This embodiment is similar to the first embodiment mentioned above, with the difference being as follows:

The sealant strip 2031 is disposed next to the color resist strip 2032 at a side near the liquid crystal layer 301.

Figure 7:
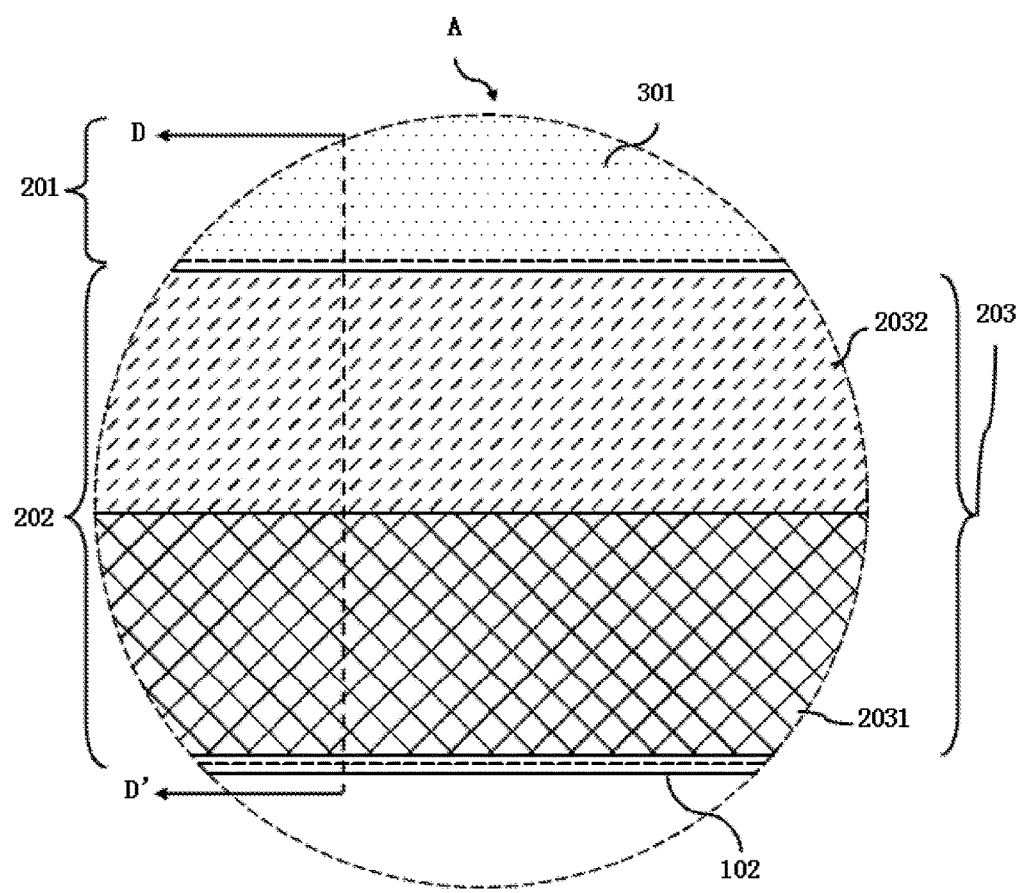
FIG. 7 is a partially enlarged top view of region A in FIG. 2 according to a third embodiment of the present invention.
Figure 8:
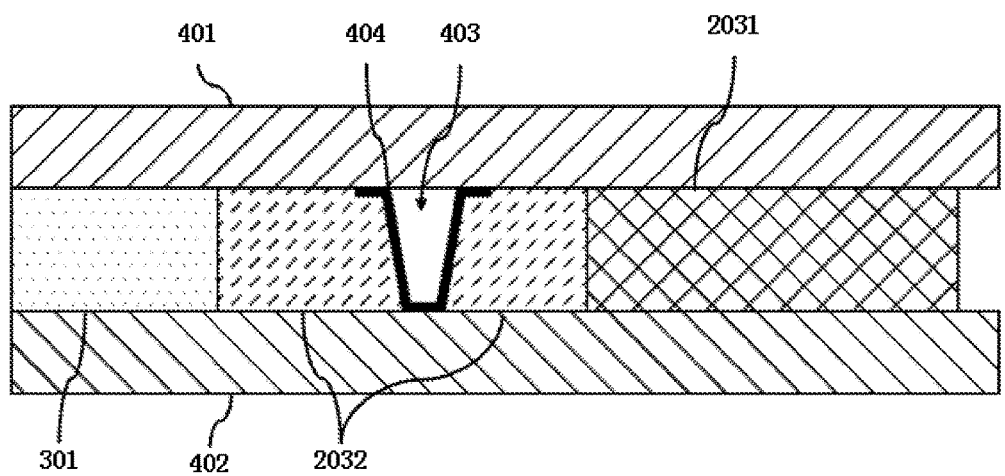
FIG. 8 is a cross-sectional view taken along a line C-C' in FIG. 7.

Refer to FIG. 7 and FIG. 8. FIG. 7 is a partially enlarged top view of region A in FIG. 2 according to a third embodiment of the present invention, and FIG. 8 is a cross-sectional view taken along a line C-C' in FIG. 7. This embodiment is similar to the first or the second embodiment, with the difference being as follows:

The sealant strip 2031 is disposed next to the color resist strip 2032 at a side away from the liquid crystal layer 301; that is, the color resist strip 2032 is disposed between the liquid crystal layer 301 and the sealant strip 2031.

Figure 9:
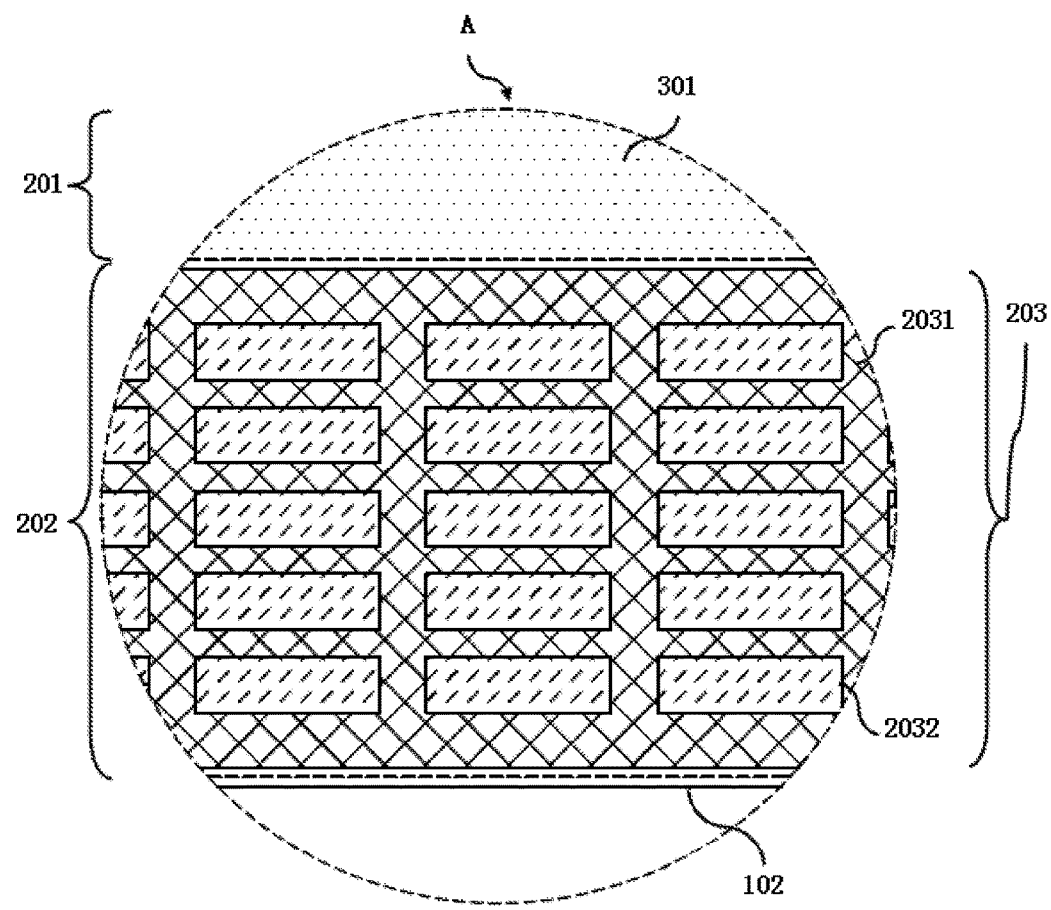
FIG. 9 is a partially enlarged top view of region A in FIG. 2 according to a fourth embodiment of the present invention.

Refer to FIG. 9, which is a partially enlarged top view of region A in FIG. 2 according to a fourth embodiment of the present invention. This embodiment is similar to any of the first, the second, and the third embodiments, with the difference being as follows:

The sealant segment includes at least one mesh, and the color resist segment includes at least one color resist block, wherein the color resist block is filled in the mesh.

The above technical solutions are beneficial for enhancing the structural strength of the sealing sections, so as to stably support the thin film transistor array substrate 402 and the color filter substrate 401.

Figure 10:
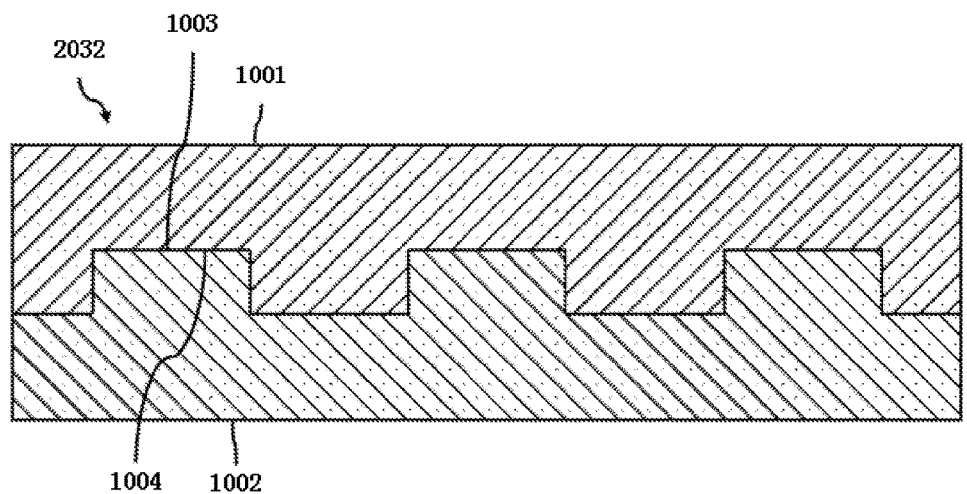
FIG. 10 is a schematic view of the color resist segment illustrated in FIGS. 3~9 according to a first example of the color resist segment.

Refer to FIG. 10, which is a schematic view of the color resist segment illustrated in FIGS. 3~9 according to a first example of the color resist segment.

The color resist segment comprises a first color resist material layer 1001 and a second color resist material layer 1002. The first color resist material layer 1001 and the second color resist material layer 1002 are integrated by stacking on each other in the first direction; and a second surface of the second color resist material layer 1002 is stacked on a first surface of the first color resist material layer 1001.

The first surface of the first color resist material layer 1001 has a first recess 1003, the second surface of the second color resist material layer 1002 has a first protrusion 1004, and the first recess 1003 on the first surface is disposed at a position corresponding with where the first protrusion 1004 is disposed on the second surface.

Figure 11:
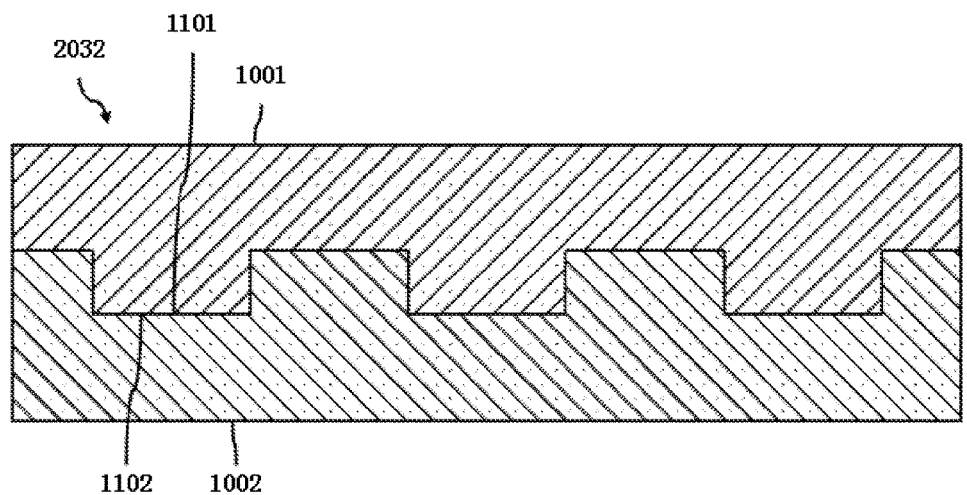
FIG. 11 is a schematic view of the color resist segment illustrated in FIGS. 3~9 according to a second example of the color resist segment.

Alternatively, as shown in FIG. 11, the first surface of the first color resist material layer 1001 has a second protrusion 1101, the second surface of the second color resist material layer 1002 has a second recess 1102, and the second protrusion 1101 on the first surface is disposed at a position corresponding with where the second recess 1102 is disposed on the second surface.

Through the above technical solutions, since the color resist segment has a higher structural strength, it is beneficial for stably supporting the thin film transistor array substrate 402 and the color filter substrate 401.

Moreover, although the present publication is illustrated and described by one or more embodiments, one skilled in the art will expect equivalent variations and modifications by understanding and reading based on the specification and the accompanying drawings. The present invention includes all such modifications and variations, and is limited only by the appended claims. Especially regarding various functions performed by the abovementioned components (such as elements, resources, etc.), the terms for describing these components mean that the specific functions (e.g. the functions of the components are equivalent) can be performed by any component (unless explicitly described), even though the structure is different from the structure disclosed in the specification for performing the same function. In addition, although the specific features correspond to only one of the embodiments in the present publication, the specific features can be expected to combine with one or more features in practice if it is advantageous to the specific features. Furthermore, in the specification, unless explicitly described to the contrary, the word "comprising", "having", and "containing" as well as their variations in the embodiments and claims will be understood to imply the inclusion of the stated elements, but not the exclusion of any other elements.

The present invention has been described with preferred embodiments thereof and it is understood that many changes and modifications to the described embodiments can be carried out without departing from the scope and the spirit of the invention that is intended to be limited only by the appended claims.

What is claimed is:

1. A display panel, comprising:
   a color filter substrate;
   a thin film transistor array substrate stacked on the color filter substrate to integrate therewith;
   a liquid crystal layer disposed between the thin film transistor array substrate and the color filter substrate; and
   a sealing element disposed between the thin film transistor array substrate and the color filter substrate, wherein the sealing element surrounds the liquid crystal layer, and is used for sealing a liquid crystal cell formed by the thin film transistor array substrate and the color filter substrate;
   wherein the liquid crystal cell includes an active area and a nonactive area, the nonactive area disposed outside of the active area, the sealing element disposed on the nonactive area;
   the sealing element includes at least four sealing sections having beginnings and ends connected to each other so as to form a sealing frame; and
   the sealing sections comprise at least one sealant segment, and at least one color resist segment;
   wherein the at least one sealant segment and the at least one color resist segment are integrated with each other; the color resist segment further has a via hole passing through the color resist segment and a protective layer on the thin film transistor array substrate in a first direction, and the first direction is perpendicular to the color filter substrate; and
   wherein the via hole has a conductive layer disposed on a side wall of the via hole, and the conductive layer is connected to a common electrode on the color filter substrate and a common line on the thin film transistor array substrate.

2. The display panel according to claim 1, wherein the sealant segment is a sealant strip; the color resist segment is a color resist strip; the sealant strip and the color resist strip are disposed side by side; and the color resist strip and the sealant strip are used together for supporting the thin film transistor array substrate and the color filter substrate, and for sealing the liquid crystal cell.

3. The display panel according to claim 2, wherein the sealant strip is disposed between two color resist strips.

4. The display panel according to claim 2, wherein the sealant strip is disposed next to the color resist strip at a side near the liquid crystal layer.

5. The display panel according to claim 1, wherein the sealant segment includes at least one mesh, and the color resist segment includes at least one color resist block, wherein the color resist block is filled in the mesh.

6. The display panel according to claim 1, wherein the color resist segment comprises a first color resist material layer, and a second color resist material layer; the first color resist material layer and the second color resist material layer are integrated by stacking each other in the first direction; and a second surface of the second color resist material layer is stacked on a first surface of the first color resist material layer.

7. The display panel according to claim 6, wherein the first surface of the first color resist material layer has a first recess, the second surface of the second color resist material layer has a first protrusion, and the first recess on the first surface is disposed at a position corresponding with where the first protrusion is disposed on the second surface.

8. The display panel according to claim 6, wherein the first surface of the first color resist material layer has a second protrusion, the second surface of the second color resist material layer has a second recess, and the second protrusion on the first surface is disposed at a position corresponding with where the second recess is disposed on the second surface.

9. A display device, comprising:
   a backlight module; and
   a display panel stacked on the backlight module to integrate therewith;
   wherein the display panel comprises:
   a color filter substrate;
   a thin film transistor array substrate stacked on the color filter substrate to integrate therewith;
   a liquid crystal layer disposed between the thin film transistor array substrate and the color filter substrate; and
   a sealing element disposed between the thin film transistor array substrate and the color filter substrate, wherein the sealing element surrounds the liquid crystal layer, and is used for sealing a liquid crystal cell formed by the thin film transistor array substrate and the color filter substrate;
   wherein the liquid crystal cell includes an active area and a nonactive area, the nonactive area disposed outside of the active area, the sealing element disposed on the nonactive area;
   the sealing element includes at least four sealing sections having beginnings and ends connected to each other so as to form a sealing frame; and the sealing sections comprise at least one sealant segment, and at least one color resist segment;

wherein the at least one sealant segment and the at least one color resist segment are integrated with each other; the color resist segment further has a via hole passing through the color resist segment and a protective layer on the thin film transistor array substrate in a first direction, and the first direction is perpendicular to the color filter substrate; and wherein the via hole has a conductive layer disposed on a side wall of the via hole, and the conductive layer is connected to a common electrode on the color filter substrate and a common line on the thin film transistor array substrate.

10. The display device according to claim 9, wherein the sealant segment is a sealant strip; the color resist segment is a color resist strip; the sealant strip and the color resist strip are disposed side by side; and the color resist strip and the sealant strip are used together for supporting the thin film transistor array substrate and the color filter substrate, and for sealing the liquid crystal cell.

11. The display device according to claim 10, wherein the sealant strip is disposed between two color resist strips.

12. The display device according to claim 10, wherein the sealant strip is disposed next to the color resist strip at a side near the liquid crystal layer.

13. The display device according to claim 9, wherein the sealant segment includes at least one mesh, and the color resist segment includes at least one color resist block, wherein the color resist block is filled in the mesh.

14. The display device according to claim 9, wherein the color resist segment comprises a first color resist material layer, and a second color resist material layer; the first color resist material layer and the second color resist material layer are integrated by stacking each other in the first direction; and a second surface of the second color resist material layer is stacked on a first surface of the first color resist material layer.

15. The display device according to claim 14, wherein the first surface of the first color resist material layer has a first recess, the second surface of the second color resist material layer has a first protrusion, and the first recess on the first surface is disposed at a position corresponding with where the first protrusion is disposed on the second surface.

16. The display device according to claim 14, wherein the first surface of the first color resist material layer has a second protrusion, the second surface of the second color resist material layer has a second recess, and the second protrusion on the first surface is disposed at a position corresponding with where the second recess is disposed on the second surface.

* * * * *